United States Patent
Yeo et al.

(10) Patent No.: US 10,601,051 B2
(45) Date of Patent: Mar. 24, 2020

(54) METHOD FOR MANUFACTURING ALL-SOLID BATTERY AND ALL-SOLID BATTERY MANUFACTURED BY THE SAME

(71) Applicants: Hyundai Motor Company, Seoul (KR); Kia Motors Corporation, Seoul (KR)

(72) Inventors: Yeol Mae Yeo, Gyeonggi-do (KR); Ki Seok Koh, Gyeonggi-do (KR); Yoon Sung Lee, Gyeonggi-do (KR); Seung Min Oh, Incheon (KR); Sang Mok Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 15/829,887

(22) Filed: Dec. 2, 2017

(65) Prior Publication Data
US 2019/0074521 A1    Mar. 7, 2019

(30) Foreign Application Priority Data
Sep. 4, 2017  (KR) .................. 10-2017-0112357

(51) Int. Cl.
*H01M 4/02* (2006.01)
*H01M 4/80* (2006.01)
*H01M 10/0585* (2010.01)
*H01M 10/04* (2006.01)
*H01M 4/66* (2006.01)
(Continued)

(52) U.S. Cl.
CPC ............. *H01M 4/80* (2013.01); *H01M 4/661* (2013.01); *H01M 10/04* (2013.01); *H01M 10/049* (2013.01); *H01M 10/058* (2013.01); *H01M 10/0562* (2013.01); *H01M 10/0585* (2013.01); *H01M 2220/20* (2013.01); *H01M 2300/0068* (2013.01); *H01M 2300/0071* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 2016/0079634 A1* | 3/2016 | Onodera | H01M 4/1391 429/49 |
| 2016/0141718 A1* | 5/2016 | Ye | H01M 4/583 429/199 |
| 2017/0207482 A1* | 7/2017 | Tomura | H01M 4/382 |

FOREIGN PATENT DOCUMENTS

| JP | 2015-076272 A | 4/2015 |
|---|---|---|
| JP | 2015-125893 A | 7/2015 |

* cited by examiner

*Primary Examiner* — Jacob B Marks
(74) *Attorney, Agent, or Firm* — Mintz Levin Cohn Ferris Glovsky and Popeo, P.C.; Peter F. Corless (57) ABSTRACT

Provided are a method of manufacturing an all-solid battery and an all-solid battery manufactured by the same for efficiently insulating an edge portion of the all-solid battery. Particularly, the all-solid batter may include a hybrid current collector comprising a porous metal current collector at the edge portions thereof, and a cathode layer or an anode layer may be further fabricated by coating a cathode active material or an anode active material on the hybrid current collector. Therefore, a short-circuit of the edge portion that may occur due to the detachment of the electrode material at the edge portion of the electrode may be prevented and a use rate and energy density of the edge portion electrode may be improved.

21 Claims, 4 Drawing Sheets

(51) Int. Cl.
*H01M 10/0562* (2010.01)
*H01M 10/058* (2010.01)

METHOD FOR MANUFACTURING ALL-SOLID BATTERY AND ALL-SOLID BATTERY MANUFACTURED BY THE SAME

CROSS-REFERENCE TO RELATED APPLICATION

This application claims under 35 U.S.C. § 119(a) the benefit of Korean Patent Application No. 10-2017-0112357 filed Sep. 4, 2017, the entire contents of which are incorporated herein by reference.

TECHNICAL FIELD

The present invention relates to a method for manufacturing an all-solid battery and an all-solid battery manufactured by the same.

BACKGROUND

With the development and propagation of vehicles using electric energy, interest in a safety-enhanced secondary battery has been increasing. For example, a commercialized lithium ion secondary battery has been used a liquid electrolyte that is volatile and vulnerable to heat, and a lithium ion secondary battery may have higher energy density. Accordingly, the lithium ion secondary battery always may have a risk of ignition and explosion. As a result, an all-solid battery with low explosion risk and high thermal stability has been in the spotlight.

In the related art, a pressing process has been applied to improve a contact between an all-solid electrolyte and an electrode when the all-solid battery is manufactured, and at this time, an edge portion of the electrode may be detached in the process of being pressurized under a high-pressure condition to cause a short-circuit of the battery. As a result, it may be required to manufacture the all-solid battery by ensuring insulation performance of the edge portion of the all-solid battery.

In the related art, for example, a technique for securing insulation performance of the edge portion of the all-solid battery by inserting an insulator into an edge portion of an electrode has been disclosed. However, when the battery is pressurized in the battery manufacturing process, the edge portion may be detached, the insulator itself may be broken, and thus, the short-circuit problem of the edge portion has not been fundamentally solved.

In addition, a technique that can prevent a short-circuit by attaching an electrode detachment portion to a tape using a pouch containing the tape has been disclosed, but there may be a high possibility of causing a short-circuit due to a gap between the pouch and the edge portion.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, the present invention may provide a method of manufacturing an all-solid battery and an all-solid battery manufactured by the same. The all-solid batter may be efficiently insulated at an edge portion while increasing a using rate of the edge portion of the all-solid battery.

The term "all-solid cell" or "all-solid battery" as described herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component. In one aspect, the present invention provides a method of manufacturing an all-solid battery. The method may include: forming a cathode layer, forming an anode layer, forming an electrolyte layer, and laminating the cathode layer, the anode layer and the electrolyte layer to form a cell structure, such that the electrolyte layer may be positioned between the cathode layer and the anode layer. In preferred aspect, at least one of the cathode layer and the anode layer may include a hybrid current collector that may include a porous metal current collector.

Preferably, the porous metal current collector may be positioned at an edge portion of the hybrid current collector. In certain embodiments, both the cathode layer and the anode layer may include the hybrid current collector comprising the porous metal current collector.

The term "hybrid current collector" as used herein refers to a current collector that may include at least two or more different materials or structures of components. Preferred hybrid current collector may include at least a porous material and other current collector including noon-porous material such as metal.

The hybrid current collector may be fabricated by welding the porous metal current collector to an outer edge portion of a metal current collector substrate of the cathode layer or the anode layer.

The method may further include, after the fabricating of the hybrid current collector, coating the hybrid current collector with an anode composite slurry or a cathode composite slurry.

The method may further include inserting and sealing the cell structure into a pouch and pressing the cell structure sealed in the pouch.

Preferably, a pore size of the porous metal current collector may be suitably about 10 μm to 0.8 mm. Preferably, a thickness of the cathode composite slurry or the anode composite slurry coated on an edge portion of the hybrid current collector may be about 20% to 60% of a thickness of the porous metal current collector.

The cathode layer, the electrolyte layer, and the anode layer may be formed to have substantially same or same area, and the porous metal current collector may suitably be formed on all the edge portions of the cathode layer or the anode layer.

In another aspect, provided is an all-solid battery including a cathode layer, an anode layer, and an electrolyte layer that is positioned between the cathode layer and the anode layer. In particular, at least one of the cathode layer and the anode layer may include a hybrid current collector including a porous metal current collector.

Preferably, the porous metal current collector may be positioned at an edge portion of the hybrid current collector. In certain embodiments, both the cathode layer and the anode layer comprise the hybrid current collector comprising the porous metal current collector.

For example, the hybrid current collector may include a metal current collector substrate and a porous metal current collector welded to an outer edge portion of the metal current collector substrate.

Preferably, the anode composite slurry may be coated on the hybrid current collector in the anode layer and/or cathode composite slurry may be coated on the hybrid current collector in the cathode layer.

Preferably, a pore size of the porous metal current collector may be about 10 μm to 0.8 mm. Further, a thickness of the cathode composite slurry or the anode composite slurry coated on an edge portion of the hybrid current collector may be about 20% to 60% of a thickness of the porous metal current collector.

Preferably, the cathode layer, the electrolyte layer, and the anode layer may have substantially or same area, and the porous metal current collector may be formed on all the edge portions of the cathode layer or the anode layer.

Further provided is a vehicle that includes the all-solid batter as described herein. As such, the cathode and anode materials may be impregnated in the porous edge portion of the hybrid current collector in the pressurizing process, thereby preventing the short-circuit of the edge portion of the electrode.

In addition, even if the insulating material is not included in the edge portion of the battery, the short-circuit of the edge portion may be prevented, thereby simplifying the process and reducing manufacturing cost due to the removal of the insulating material of the edge portion.

In particular aspects, the edge portion may be formed while the cathode and anode materials are impregnated in the porous hybrid current collector, thereby increasing a using rate of the edge portion of the all-solid battery and increasing the energy density of the battery.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Reference numerals set forth in the Drawings includes reference to the following elements as further discussed below:

10: cathode layer
11: hybrid current collector (cathode side)
11a: metal current collector  11b: porous metal current collector
12: cathode composite slurry
20: anode layer
21: hybrid current collector (anode side)
21a: metal current collector  21b: porous metal current collector
22: anode composite slurry
30: electrolyte layer  P: particles of the electrode material It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, preferred exemplary embodiments of the present invention will be described in detail with reference to the accompanying drawings.

Figure 1:
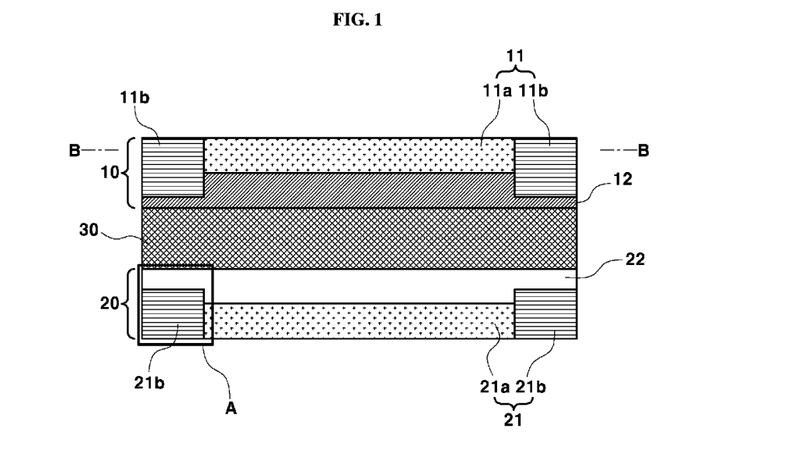
FIG. 1 is a cross-sectional view of an exemplary all-solid battery according to an exemplary embodiment of the present invention.

As illustrated in FIG. 1, an exemplary all-solid battery according to the present invention may include a hybrid current collector including a porous metal current collector. For instance, the porous metal current collector may be included in an edge portion of the battery. A cell structure a laminated structure may be formed by laminating the cathode layer, the anode layer and the electrolyte layer, such that the electrolyte layer 30 is inserted between a cathode layer 10 and an anode layer 20. In one preferred aspect, the method of manufacturing the all-solid battery according to the present invention may include: i) forming the cathode layer 10, ii) forming the anode layer 20, and iii) forming an electrolyte layer 30. In addition, the method may further include laminating the cathode layer, the anode layer and the electrolyte layer such that the electrolyte layer is positioned between the cathode layer 10 and the anode layer 20.

Particularly, in the all-solid battery according to the present invention, at least one of the cathode layer 10 and the anode layer 20 may include the hybrid current collectors 11 and 21, respectively. The edge portions of the hybrid current collectors 11, 21 may be formed of porous metal current collectors 11b and 21b in order to prevent the short-circuit of the edge portions.

The hybrid current collectors 11 and 21 may be fabricated by welding the porous metal current collectors 11b and 21b along the outer side thereof with central metal current collectors 11a and 21a. The welding method that may be applied at this time may include thermal welding, ultrasonic welding, laser welding, and the like, but not be limited thereto.

The cathode layer 10 or the anode layer 20 according to the present invention may be formed by coating a cathode composite slurry 12 or an anode composite slurry 22 on the hybrid current collectors 11 and 21. For example, as illustrated in FIG. 4B, the cathode composite slurry 12 or the anode composite slurry 22 may be coated over the entire area of the hybrid current collectors 11 and 21. At this time, the cathode layer 10 or the anode layer 20 may be coated with a predetermined thickness over the whole area. Alternatively, the cathode composite slurry 12 or the anode composite slurry 22 may be coated over the predetermined area of the hybrid current collectors 11 and 21.

The anode composite slurry 22 may include an anode active material, such as silicon (Si), tin (Sn), and graphite, which may be generally used in the secondary battery. Further, the cathode composite slurry 12 may include a cathode active material, and the cathode active material may suitably include lithium nickel cobalt manganese (NCM), lithium cobalt oxide (LCO), lithium nickel cobalt aluminum (NCA), and lithium ferric phosphate (LFP)-based materials, which are generally used in the secondary battery.

The anode composite and the cathode composite may be in form of combining an anode active material and a cathode active material with a conductive material and a binder, respectively. Preferably, the anode composite and the cathode composite may be coated in slurry forms, respectively. As the coating method at this time, methods which are generally used in the electrode coating such as bar coating and gravure coating may be applied.

The electrolyte layer 30 is positioned between the cathode layer 10 and the anode layer 20, and the electrolyte layer 30 may be formed by inserting a solid electrolyte including a sulfide or oxide-based material having ion conductivity of about 10 to 34 s/cm or more by a lamination or coating method.

Figure 2:
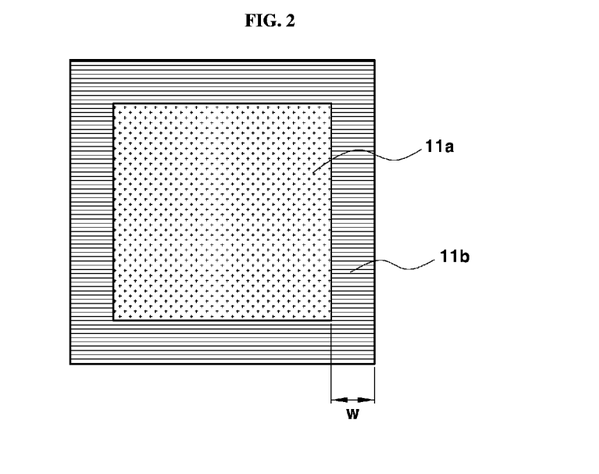
FIG. 2 illustrates a cross section for B-B' in the all-solid battery of FIG. 1.

FIG. 2 illustrates a cross section of B-B' in FIG. 1 for describing the configuration of the hybrid current collectors. For example, as shown in FIG. 2, in the all-solid battery according an exemplary embodiment of the present invention, the whole edge portion of the electrode may be formed of the porous metal current collectors 11b and 21b, thereby preventing detachment of the electrode material during the pressurizing process by the porous metal current collectors 11b and 21b.

The metal current collectors 11a and 21a used as the substrate may suitably be aluminum (Al), nickel (Ni), copper (Cu) or nickel (Ni) plated with copper (Cu), which is generally used in the art, and the porous metal current collectors 11b and 21b of the edge portion may suitably include the same material as or different from the material of the metal current collectors 11a and 21a used at the central portion.

Preferably, for effective prevention of short-circuit, the porous metal current collectors 11b and 21b may be formed on all the edge portions in an outer direction of the cathode layer 10 or the anode layer 20 as illustrated in FIG. 2.

Preferably, a width W of the porous metal current collector 11b may be formed in the range of about 1 mm to 5 cm in a direction perpendicular to the laminated direction. When the width W of the porous metal current collector of the edge portion is less than about 1 mm, all the detached portions of the electrode may not be covered by the porous metal current collector during cold isostatic pressing, and when the width W of the porous metal current collector is greater than about 5 cm, the porous metal current collector may have unnecessary area for covering the detached area of the electrode during the cold isostatic pressing.

In this case, since the porous metal current collector is impregnated with a greater amount of electrode material than that of a general metal current collector during coating, it may be disadvantageous in terms of ionic conductivity as compared with the general metal current collector. Also, when the pressure is applied, the electrode surface may be excessively compressed in the process in which the electrode material may be impregnated in the porous metal current collector. The porous metal current collector may suitably be present only at the edge portion for preventing the short-circuit, and the edge portion of the porous metal current collector may be formed to have a width of 5 cm or less in consideration of the battery size and the like.

The pores of the porous metal current collectors 11b and 21b may be suitably formed with an average size of about 10 μm to 0.8 mm.

Figure 3:
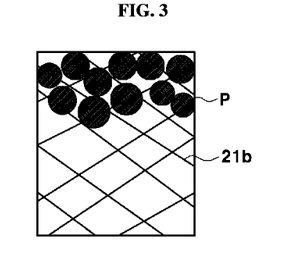
FIG. 3 is an enlarged view illustrating a region A of the all-solid battery of FIG. 1.

For example, FIG. 3 is an enlarged view of a region A in FIG. 1. particles P of the electrode material may be impregnated into the pores of the porous metal current collector 21b.

Accordingly, since the preferred pore size of the porous metal current collector is relatively greater than the sizes of the electrode material components such as the cathode and anode active materials and conductive material which are generally used, the size of the pore may be at least 10 μm. However, when the pore size is greater than about 0.8 mm, the slurry may not be coated by passing through the porous metal current collector when the electrode slurry is coated, and thus the pore size may suitably be 0.8 mm or less.

In the preferred embodiment of the present invention, the porosity of the porous metal current collectors 11b and 21b may be about 20% to 98%. Since the pores are randomly formed and arranged in the porous metal current collector, the porosity may be at least 20% or greater so that the electrode material may be impregnated by the pressure process. On the other hand, even if the porosity is 98%, the electrode material may be impregnated, but when the porosity is greater than 98%, the slurry may not be coated by completely passing through the porous metal current collector when the electrode slurry is coated, and thus, the porosity may suitably be about 98% or less.

Meanwhile, when the anode or cathode material is coated on the hybrid current collector, the coating thickness may be about 20% to 60% of a thickness $t_1$ of the porous metal current collectors 11b and 21b.

For example, a thickness $t_2$ of the cathode composite slurry 12 or the anode composite slurry 22 coated on the edge portion of the hybrid current collector may be about 20% to 60% of the thickness $t_1$ of the porous metal current collectors 11b and 21b.

Generally, when the electrode coated surface is uniform in the fabrication of a laminated cell, the laminated cell may be fabricated without a gap. When the electrode material is coated with less than about 20% of the thickness of the porous metal current collector, the coating material may be fully impregnated into the porous metal current collector, and thus, a non-uniform coated surface may be formed. On the other hand, when the electrode material is coated with greater than about 60% of the thickness of the porous metal current collector, the electrode material may pass through the porous metal current collector, and thus, the coating thickness may be 60% or less of the thickness of the porous metal current collector.

Figure 4A:
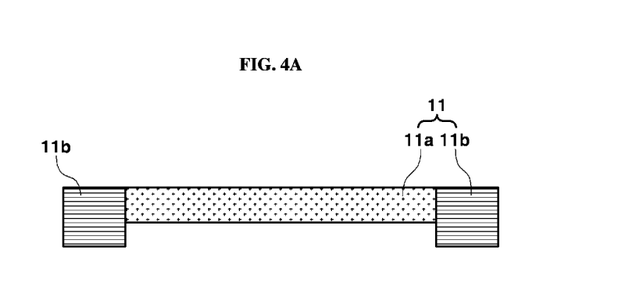
FIGS. 4A to 4C illustrate an exemplary method for manufacturing an exemplary all-solid battery according to an exemplary embodiment of the present invention.
Figure 4B:
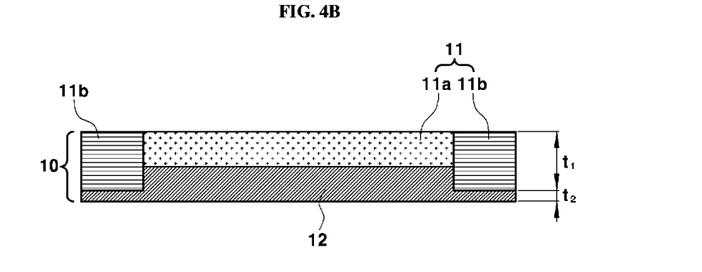
Figure 4C:
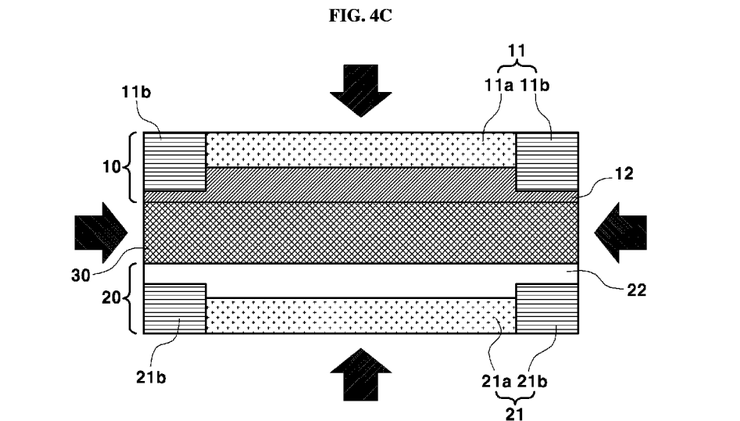

The method of manufacturing the all-solid battery according to the preferred embodiment of the present invention is illustrated in FIGS. 4A to 4C.

As illustrated in FIG. 4A, the porous metal current collector 11b may be welded along the edge portion of the metal current collector 11a to fabricate the hybrid current collector 11.

When the hybrid current collector 11 is fabricated, as illustrated in FIG. 4B, the cathode layer 10 may be fabricated by coating the cathode composite slurry 12 on the hybrid current collector 11. The anode layer 20 may also be fabricated in the same manner When the cathode layer 10 or the anode layer 20 is fabricated, a laminated cell illustrated in FIG. 4C may be fabricated by inserting the solid electrolyte therebetween by a lamination or coating method. The laminated cell fabricated by the above method may be inserted into the foamed pouch and vacuum-sealed.

The pouch cell completed by the above method is compressed by a cold isostatic pressing method or the like to complete the battery with the insulated edge portion. The cold isostatic pressing may include a uniformly applying the pressure due to the liquid in all directions at a low temperature. For example, the cell laminated in a vessel containing a liquid therein may be configured to position the pouch cell received in the pouch and receive uniform pressure in all directions of the pouch cell. In this case, the method may be performed at a low temperature condition, e.g., the low temperature condition of the liquid contained in the vessel. Accordingly, the pressure condition in the cold isostatic pressing process may be about 3 ton/m² to 5 ton/m².

When the all-solid battery is manufactured through such a process, the cathode and anode materials may be impregnated in the porous edge portion of the hybrid current collector during the cold isostatic pressing to prevent the short-circuit. As a result, the insulating material for insulating the edge portions of the all-solid battery may be removed, thereby reducing the production cost. In addition, as compared with the case of using the insulating material, since the cathode and anode materials are impregnated in the porous edge portion of the hybrid current collector, the coated electrode material may be used for power generation, thereby improving a use rate of the battery.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an all-solid battery, comprising:
   forming a cathode layer,
   forming an anode layer, and
   forming an electrolyte layer;
   laminating the cathode layer to form a cell structure, wherein the anode layer and the electrolyte layer such that the electrolyte layer is positioned between the cathode layer and the anode layer,
   wherein at least one of the cathode layer and the anode layer comprise a hybrid current collector and the hybrid current collector comprises a central metal current collector and a porous metal current collector formed along an outer edge portion of the central metal current collector.

2. The method of claim 1, wherein the porous metal current collector is positioned at an edge portion of the cathode layer and/or the anode layer.

3. The method of claim 1, wherein both the cathode layer and the anode layer comprise the hybrid current collector comprising the porous metal current collector.

4. The method of claim 1, wherein the hybrid current collector is fabricated by welding the porous metal current collector to the outer edge portion of the central metal current collector as a substrate of the cathode layer or the anode layer.

5. The method of claim 4, further comprising: after fabricating the hybrid current collector, coating the hybrid current collector with an anode composite slurry or a cathode composite slurry.

6. The method of claim 1, further comprising:
   inserting and sealing the cell structure into a pouch; and
   then pressing the cell structure sealed in the pouch.

7. The method of claim 1, wherein a pore size of the porous metal current collector is about 10 μm to about 0.8 mm.

8. The method of claim 4, wherein a thickness of the cathode composite slurry coated on the edge portion of the hybrid current collector is about 20% to 60% of a thickness of the porous metal current collector in the cathode layer.

9. The method of claim 5, wherein a thickness of the anode composite slurry coated on the edge portion of the hybrid current collector is about 20% to 60% of a thickness of the porous metal current collector in the anode layer.

10. The method of claim 1, wherein the cathode layer, the electrolyte layer, and the anode layer are formed to have the same area, and the porous metal current collector is formed on all the edge portions of the cathode layer or the anode layer.

11. An all-solid battery, comprising:
    a cathode layer,
    an anode layer, and
    an electrolyte layer, wherein the electrolyte layer is positioned between the cathode layer and the anode layer,
    wherein at least one of the cathode layer and the anode layer comprise a hybrid current collector and the hybrid current collector comprises a central metal current collector and a porous metal current collector formed along an outer edge portion of the central metal current collector.

12. The all-solid battery of claim 11, wherein the porous metal current collector is positioned at an edge portion of the cathode layer and/or the anode layer.

13. The all-solid battery of claim 11, wherein both the cathode layer and the anode layer comprise the hybrid current collector comprising the porous metal current collector.

14. The all-solid battery of claim 11, wherein the hybrid current collector comprises a central metal current collector substrate and a porous metal current collector welded to the outer edge portion of the central metal current collector as a substrate.

15. The all-solid battery of claim 13, wherein an anode composite slurry is coated on the hybrid current collector in the anode layer and/or a cathode composite slurry is coated on the hybrid current collector in the cathode layer.

16. The all-solid battery of claim 11, wherein a pore size of the porous metal current collector is about 10 µm to 0.8 mm.

17. The all-solid battery of claim 14, wherein a thickness of the cathode composite slurry coated on the edge portion of the hybrid current collector is about 20% to 60% of a thickness of the porous metal current collector in the cathode layer.

18. The all-solid battery of claim 14, wherein a thickness of the anode composite slurry coated on the edge portion of the hybrid current collector is about 20% to 60% of a thickness of the porous metal current collector in the anode layer.

19. The all-solid battery of claim 11, wherein the cathode layer, the electrolyte layer, and the anode layer are formed to have the same area, and the porous metal current collector is formed on all the edge portions of the cathode layer or the anode layer.

20. A vehicle comprising an all-solid battery of claim 11.

21. The all-solid battery of claim 11, wherein particles P of the electrode material are impregnated into pores of the porous metal current collector.

\* \* \* \* \*